United States Patent [19]

Baldwin

[11] Patent Number: 4,570,081
[45] Date of Patent: Feb. 11, 1986

[54] ISOLATED PUMP IN A DOUBLE PASS PUMP RAMAN OSCILLATOR AND OPTIMUM CONVERSION OF PUMP ENERGY IN A RAMAN OSCILLATOR AND AMPLIFIER

[75] Inventor: Gary D. Baldwin, Columbia, Md.

[73] Assignee: Westinghouse Electric Corp., Pittsburgh, Pa.

[21] Appl. No.: 508,202

[22] Filed: Jun. 27, 1983

[51] Int. Cl.[4] .......................... G02F 1/35; H01S 3/30
[52] U.S. Cl. ...................................... 307/426; 372/3; 372/55; 372/70
[58] Field of Search ................. 307/425, 426; 372/70, 372/3, 55; 330/4.3

[56] References Cited

U.S. PATENT DOCUMENTS 4,280,109  7/1981  Stappaerts ........................... 307/426

Primary Examiner—James W. Davie
Attorney, Agent, or Firm—J. B. Hinson

[57] ABSTRACT

A radiation pump recovery system for a double pass pump Raman oscillator is described incorporating a polarizer and quarter waveplate positioned in the optical path of the input pump radiation and functions to separate the reflected pump radiation coming back from the Raman oscillator along the input optical path from said input optical path. In an alternate embodiment the recovery system may include an additional quarter waveplate and mirror to permit unpolarized pump radiation to be separated into two polarizations to drive two Raman oscillators and whereby the reflected pump radiation coming back from the Raman oscillators along the respective input optical paths is separated from said respective input optical path and recombined into a single beam. An alternate embodiment utilizes the rejected pump energy in a Raman amplifier to provide optimal conversion efficiency. The oscillator which may be single pass pump or double pass pump Raman oscillator and amplifier utilize a common Raman active gas in a common housing having windows to provide separate optical paths for the oscillator and amplifier.

3 Claims, 6 Drawing Figures

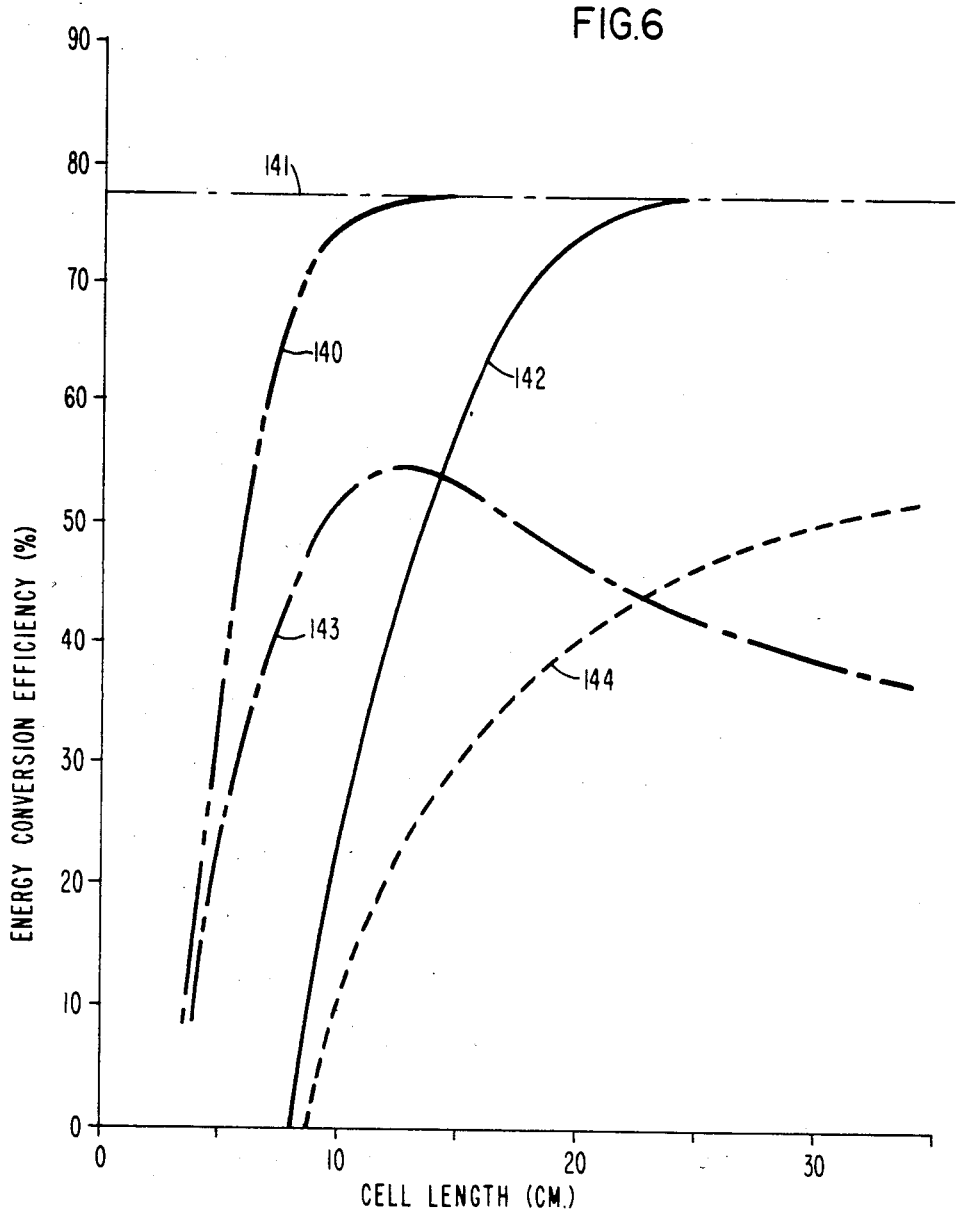

ISOLATED PUMP IN A DOUBLE PASS PUMP RAMAN OSCILLATOR AND OPTIMUM CONVERSION OF PUMP ENERGY IN A RAMAN OSCILLATOR AND AMPLIFIER

BACKGROUND OF THE INVENTION

1. Field of the Invention

This invention relates to a Double Pass Pump Raman oscillator in combination with an optical system for preventing pump energy not absorbed in the oscillator from reentering the pump source optical path.

The invention further relates to optimal conversion of all of the pump energy to a desired output wavelength of radiant energy by coupling the output of a Raman oscillator and the non-absorbed pump energy to a Raman amplifier.

2. Description of the Prior Art

Longitudinally pumped oscillators fall into two distinct categories; (1) a single pass pump (SPP) configuration in which the pump beam makes a single pass through the gain medium, and (2) a double pass pump (DPP) configuration in which the pump beam is totally reflected by one of the resonator mirrors of the oscillator to make a double pass through the gain medium. A type of laser oscillator of this type is comprised of a resonate optical cavity containing a gain medium positioned therein. A housing is provided as part of the oscillator to maintain the Raman active gas at a predetermined pressure.

Efficient Raman generation in gases is achieved through the use of a Raman oscillator which is pumped longitudinally by a semi-collimated beam of an exciting laser. In the visible and near infrared portion of the spectrum, energy conversion efficiencies are typically on the order of 30 to 50%. A major problem associated with the implementation of a double pass pump oscillator concerns unused pump energy which exits back along the optical path of the pump source after a double pass in the resonate cavity. If this energy is permitted to be redirected back along the optical path of the pump source, serious amplitude stability and/or optical component damage could result. In addition, in some applications it is desirable to recover the unused pump radiation for use elsewhere in the optical system.

The energy conversion efficiency of the Raman oscillator is limited by the occurrence of parasitic oscillations and unwanted Stokes and antistokes orders. While careful attention to resonator mirror reflectivities may increase the maximum conversion efficiency attainable at the desired Stokes order, practical devices are limited to 40 to 50% conversion efficiencies from the original pump energy. Theoretical conversion efficiencies of the pump energy to the first Stokes order typically fall in the range from 70 to 90%. The theoretical energy conversion efficiency is based upon a photon in the pump beam being converted to a photon in the first Stokes order with the difference in photon energy being absorbed as heat in the gas in the form of molecular vibration or rotation.

Energy conversion efficiencies approaching the theoretical limit can be achieved by combining a Raman oscillator with a serial single pass Raman amplifier. The Raman oscillator is operated below the threshold of parasitic oscillations to provide an output of the first Stokes order plus the unused or unabsorbed pump energy. The unused pump energy is fed into the Raman amplifier along with the output of the Raman oscillator to further convert the unused pump energy to radiant energy of the wavelength of the Raman oscillator output. The gain level of the Raman amplifier is maintained below the avalanche threshold by delaying the unused pump energy exiting the Raman oscillator relative to the first Stokes radiation from the oscillator. Essentially 100% of the pump radiation injected into the Raman amplifier is converted into signal radiation of the first Stokes order.

In present systems, a Raman oscillator is provided by housing and active Raman gas at a pressure such as 1,000 psi in a vessel having windows to permit an optical path through the Raman active gas. Optical components are placed outside of the vessel in the optical path going through the vessel to permit a resonate cavity to be formed. In present systems, a separate Raman amplifier is provided housing an active Raman gas at a pressure of 1,000 psi. Windows are provided in the vessel to provide an optical path through the Raman active gas.

It is therefore desirable to provide optical components for efficiently recovering pump radiation exiting a double pass pump Raman oscillator where the pump radiation is either polarized or unpolarized.

It is further desirable to provide high energy conversion efficiency of the pump radiation by employing a common pressure vessel containing a Raman active gas for both the Raman oscillator and Raman amplifier.

It is further desirable to implement a single pass pump oscillator or a double pass pump oscillator in series with a Raman amplifier using a common pressure vessel holding Raman active gas with a plurality of optical channels or paths therethrough.

SUMMARY OF THE INVENTION

In accordance with the present invention, an apparatus and method is described for recovering unused pump energy exiting from a double pass pump Raman oscillator comprising a polarizer, $\lambda/4$ plate, and a Raman oscillator in the optical path of the pump input and in the optical path of the exiting pump radiation from the Raman oscillator wherein the quarter wave plate effectively rotates the polarization 90° and where the polarizer reflects the exiting pump radiation out of the optical path of the pump input.

The invention further provides apparatus to convert first radiant energy of a first wavelength to second radiant energy of a second wavelength with high conversion efficiency comprising a Raman oscillator adapted for receiving a beam of first radiant energy also known as pump energy, the Raman oscillator is operated below a predetermined intensity of the pump energy to limit unwanted Stokes and antistokes orders to provide an output of second radiant energy and of unconverted first radiant energy known as rejected pump energy. A single pass Raman amplifier having an input and output and mirrors and lenses are used for coupling the second radiant energy from the output of the Raman oscillator to the input of the Raman amplifier. Additional mirrors are spaced apart for delaying the unconverted first radiant energy from the Raman oscillator prior to directing it to an input of the Raman amplifier wherein the Raman amplifier converts the first radiant energy to second radiant energy by stimulated Raman scattering to provide an output substantially of second radiant energy. The Raman oscillator and the single pass Raman amplifier use Raman active gas contained in a common pressure vessel having windows to provide separate optical paths for the Raman oscillator and the Raman amplifier.

The invention further provides a new gas suitable for stimulated Raman scattering selected from the group consisting of $CD_4$, $CH_3D$, $CH_2D_2$ and $CHD_3$ and mixtures thereof.

BRIEF DESCRIPTION OF THE DRAWINGS

FIG. 6 is a graph showing energy conversion efficiency versus cell length.

DESCRIPTION OF THE PREFERRED EMBODIMENT

Figure 1:
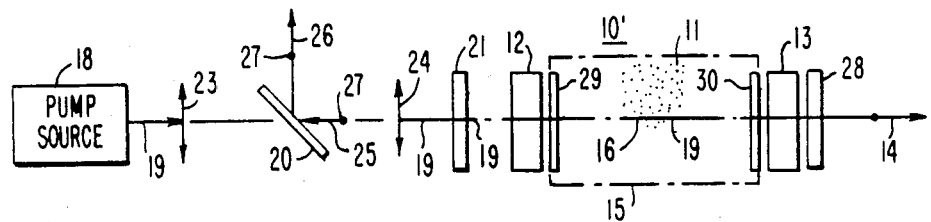
FIG. 1 is a schematic view of one embodiment of the invention.

Referring to the drawing, and in particularly to FIG. 1, a double pass pump Raman oscillator is shown having a gas suitable for providing stimulated Raman scattering and an optical cavity comprising reflectors 12 and 13. Reflector 12 is transmissive to the wavelength of the pump radiation while being reflective to the wavelength of the Raman scattered radiation. Reflector 13 is partially reflective to the desired Raman scattered radiation, such as the first Stokes, in order to permit the output from the Raman oscillator as shown by arrow 14. Reflector 13 is totally reflecting to radiation of the wavelength of the pump input. The housing or pressure vessel 15 is provided for containing the gas 11 at a suitable pressure between reflectors 12 and 13. Reflectors 12 and 13 are aligned to generate the Raman output along axis 16 which is coaxial with output arrow 14. Reflectors 12 and 13 may perform the dual function of resonant cavity reflectors and pressure vessel windows although separate windows, with reflectors located external to the pressure vessel 15, could be employed; the pressure vessel 15 would then contain windows 29 and 30.

Pump source 18 provides a source of radiation, such as from a laser, along optical path 19 through polarizer 20 and quarter wave plate 21. The radiation from pump source 18 may be polarized as shown by arrow 23 which passes through polarizer 20 which is unaffected as shown by arrow 24 to have the same polarization as arrow 23. The pump radiation from pump source 18 passes through quarter wave plate 21 wherein the polarization is changed from linear to circular and through transmissive reflector 12 and through gas 11 wherein a portion of the pump radiation is scattered causing the generation of the output radiation at a different wavelength such as the first Stokes.

Methane, $CH_4$, as well as deuterium, $D_2$, are typical Raman active gases exhibiting high conversion efficiencies when excited by pump radiation in the visible portion of the spectrum. When methane is excited by pump radiation in the near infrared around 1000 nanometers such as by a YAG:Nd laser, vibrational overtone absorption in $CH_4$ seriously degrades laser performance. Satisfactory operation can be restored in this latter case, via shifting the gas absorption bands to another portion of the electromagnetic spectrum, by replacing $CH_4$ with its deuterated variant $CD_4$. Fine tuning of the wavelengths associated with overtone absorption, to provide improved laser performance at other pump wavelengths, is available through the use of the methane variants $CH_3D$, $CH_2D_2$ and $CHD_3$ where D is deuterium; an isotope of hydrogen. Typical operating pressures fall in the range of 500 to 1000 psi at 25° C. for these gases while laser performance remains essentially independent of temperatures from $-50°$ to $+50°$ C.

The pump radiation is totally reflected by reflector 13 wherein it is reversed in direction and passes through gas 11 again and through reflector 12. The pump radiation at this point is heading in the opposite direction as the input pump radiation and is circularly polarized in the reverse sense to the input pump radiation. After it passes through the quarter waveplate 21 a second time the pump radiation is orthogonally polarized to its original state as shown by the solid circle 27 and is deflected from optical path 19 by polarizer 20. Optical path 19 may be colinear with axis 16.

A significant advantage of the double pass pump oscillator provided by reflector 13, as compared to the single pass pump oscillator, is a two to one reduction in lasing threshold. For certain applications, it is critical that a Raman oscillator be of minimum size and weight. All else being equal, a double pass pump oscillator would be approximately one-half the size and weight of a single pass pump oscillator.

It is well established that the Raman conversion process in gas 11 preserves the polarization state of the pump beam consequently, a quarter waveplate 28 can be placed at the Raman output of the double pass pump Raman oscillator to linearize the polarization of the Raman output shown by arrow 14.

The pump radiation emerging from oscillator 10 after passing through a quarter waveplate 21 is shown by arrow 25 and the pump radiation after being reflected by polarizer 20 is shown by arrow 26.

Figure 2:
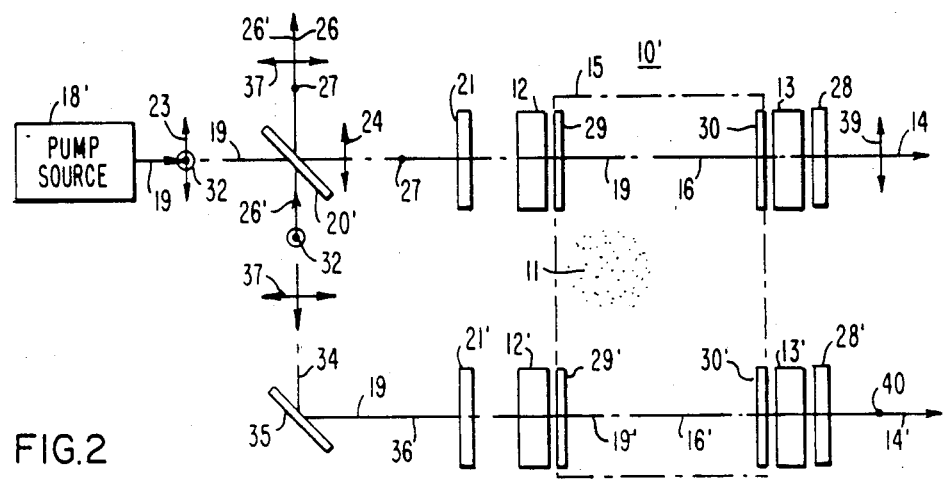
FIG. 2 is a schematic view of an alternate embodiment of the invention.

Referring to FIG. 2 an alternate embodiment is shown incorporating two parallel double pass pump oscillators 10' in a single housing 15 containing a common Raman gas medium 11. In FIG. 2 like references are used for functions corresponding to the apparatus of FIG. 1. In FIG. 2 like references primed are used for functions corresponding to unprimed numbers of the apparatus of FIG. 1. In FIG. 2 pump source 18' supplies unpolarized pump radiation along optical path 19. The pump radiation from pump source 18' has one polarized component shown by arrow 23 and another orthogonal component shown by a solid circle 32. The symbol indicates an arrow normal to the drawing. The polarized pump radiation represented by arrows 23 and 32 represent the respective components of the unpolarized pump radiation from pump source 18'. As in FIG. 1 the polarized component shown by arrow 23 passes through polarizer 20 along optical path 19 wherein it is reflected by reflector 13 back along optical path 19 through quarter wave plate 21 wherein it is reflected by a polarizer 20 along an optical path shown by arrow 26. The orientation of polarization of the reflected beam is shown by solid circle 27.

Likewise the radiation component represented by solid circle 32 is reflected by polarizer 20 along the optical path 34 wherein it is reflected by mirror 35 along optical path 36. The pump radiation passes through quarter waveplate 21' wherein it is circularly polarized and passes through transmissive reflector 12' and is reflected by reflector 13' back along optical path 19' through reflector 12′ and quarter waveplate 21′. The reflected pump radiation passes along optical path 19′ and is reflected by mirror 35 along optical path 34 shown by arrow 26′ having a polarization component shown by arrow 37. The pump radiation that is reflected by reflector 13′ passes through polarizer 20 to be combined with the pump radiation reflected by reflector 13 shown by arrow 26 as a rejected pump beam having two orthogonal polarization components shown by solid circle 27 and arrow 37.

As shown in FIG. 2, the pump radiation reflected by reflectors 13 and 13′ passes back through reflectors 12 and 12′ and is collected or recombined as shown by arrow 26 and 26′ which may be subsequently used in other portions of an optical system. At the same time the reflected pump radiation is prevented from returning along optical path 19 of pump source 18′ and into pump source 18′ which may cause damage and operational instability of the pump source 18′. Specifically polarizer 20, quarter waveplates 21 and 21′ and mirror 35 provide the pump recovery scheme which is positioned between the pump source 18′ and the two oscillator channels 10′. The placement of quarter waveplates 28 and 28′ at the output of oscillator 10′ is optional and merely converts the circular polarization to linear polarization shown by arrows 39 and 40.

Figure 3:
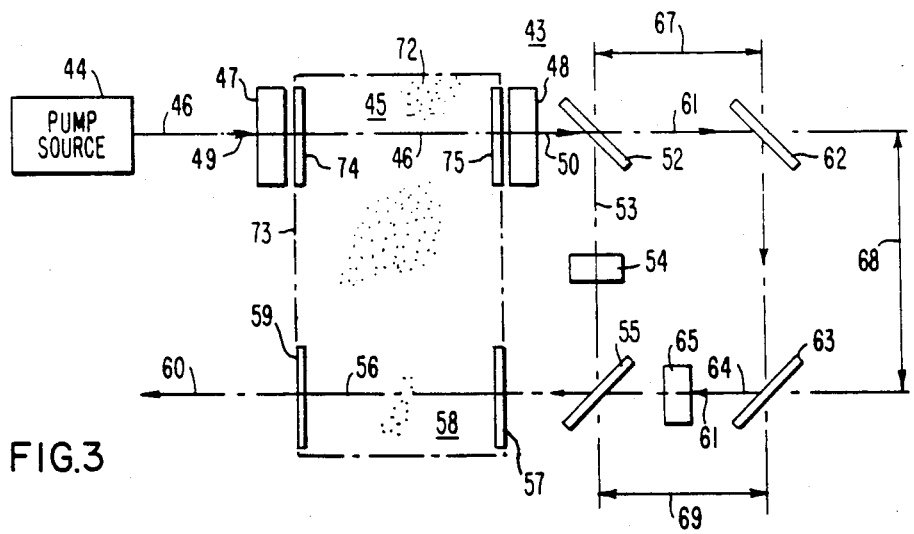
FIG. 3 is a schematic view of an alternate embodiment of the invention.

Referring to FIG. 3, apparatus 43 is shown to convert first radiant energy of a first wavelength to second radiant energy of a second wavelength with high conversion efficiency. Pump source 44 may supply a beam of radiant energy at a first wavelength to Raman oscillator 45 along optical path 46. Raman oscillator 45 may include a resonate cavity including reflectors 47 and 48 which may be transmissive at the wavelength of radiant energy 49 from pump source 44. Reflector 47 may be totally reflecting at the first Stokes wavelength while reflector 48 may be partially transmissive at the first Stokes wavelength. A portion of radiant energy 49 passing through Raman oscillator 45 is converted by stimulated Raman scattering to the first Stokes wavelength which is reflected back and forth by reflectors 47 and 48 exits oscillator 45 through reflector 48 shown by arrow 50. The intensity of pump radiant energy 49 entering Raman oscillator 45 is below a predetermined intensity to limit unwanted Stokes and antistokes orders to provide an output of radiant energy at the first Stokes wavelength. Radiant energy at the first Stokes wavelength exiting oscillator 45 is reflected by mirror 52 along optical path 53 through lens 54 to mirror 55. Radiant energy along optical path 53 is reflected by mirror 55 along optical path 56 through a window 57 into Raman amplifier 58. Radiant energy of the first Stokes wavelength entering the input of amplifier 58 passes through to the output by way of window 59 shown by arrow 60.

The pump radiant energy 49 passing through oscillator 45 and not absorbed passes through mirror 52 shown by arrow 61 and is reflected by mirrors 62 and 63 along optical path 64 which is colinear with optical path 56. Radiant energy shown by arrow 61 passes through lens 65 and through mirror 55 into amplifier 58 by way of window 57. Lens 65 may include several lenses in combination to alter beam size. Stimulated Raman scattering converts to pump radiant energy at the first wavelength to radiant energy at the first Stokes wavelength and exits through window 59 from amplifier 58 shown by arrow 60.

The additional path length of the pump radiant energy of the first wavelength from oscillator 45 to amplifier 56 shown by arrow 67 and 69 provide a means for delaying the unconverted pump radiant energy of the first wavelength relative to the radiant energy of the first Stokes wavelength.

Mirrors 52 and 55 are transmissive to the first wavelength while thoroughly reflecting at the first Stokes wavelength. Lenses 54 and 65 may include several lenses in combination to provide a means for adjusting the diameter of the beam of radiant energy along optical paths 53 and 64, respectively. The diameter of the beam is adjusted to control the intensity of the unconverted pump energy entering amplifier 56. The diameter of the beam of the first Stokes wavelength is adjusted to match the diameter of the pump energy entering amplifier 56. Lens 65 and the delay provided by the additional path length of the unconverted pump energy provides a means of controlling the gain level in the Raman amplifier below the avalanche threshold value while simultaneously supplying a sufficiently strong signal at the first Stokes wavelength to be amplified to essentially convert 100% of the pump radiation 61 to the first Stokes wavelength.

Raman oscillator 45 and amplifier 58 utilize a Raman active gas 72 such as methane, deuterium, deuterated methane, etc. at a pressure of 1000 lbs. per square inch which is contained in a common pressure vessel 73. Reflectors or mirrors 47 and 48 perform the dual function of resonant cavity reflectors and pressure vessel windows although separate windows, with mirrors located external to the pressure vessel, could be employed; the pressure vessel would then contain windows 74 and 75. Windows 74 and 75 provide a means for injecting pump energy through oscillator 45 along optical path 46 and windows 57 and 59 provide a means for injecting radiant energy at the pump wavelength and first Stokes wavelength into amplifier 58 along optical path 56.

Figure 4:
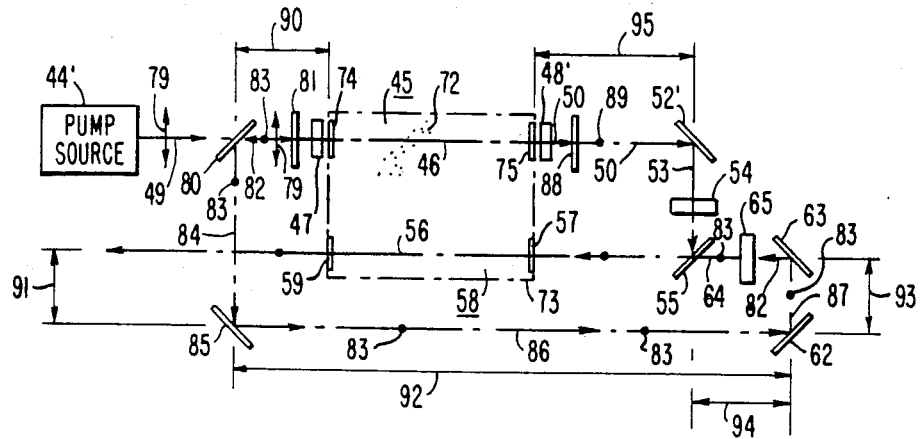
FIG. 4 is a schematic view of an alternate embodiment of FIG. 3.

FIG. 4 is a schematic view of an alternate embodiment of FIG. 3. In FIG. 4, like references are used for functions corresponding to the apparatus of FIG. 3. In FIG. 4, a pump source 44′ of radiant energy shown by arrow 49 having a preferred polarization shown by arrow 79 passes through polarizer 80 and through quarter wave plate 81 into oscillator 45 along optical path 46. A portion of pump radiant energy 49 which is not converted by stimulated Raman scattering in oscillator 45 is reflected by reflector 48′ back through oscillator 45. The unconverted pump radiant energy passes through quarter wave plate 81. The rejected pump energy from double pass pump oscillator 45 after passing through quarter wave plate 81 is shown by arrow 82 having a polarization orthogonal to arrow 79 which is normal to the plane of the page shown by a solid circle 83. Rejected pump energy 82 is reflected by a polarizer 80 along optical path 84 having a polarization shown by solid circle 83 which is normal to the page. Rejected pump energy on optical path 84 is reflected by mirror 85 along optical path 86 where it is reflected by mirror 62 along optical path 87. Rejected pump energy 82 traveling along optical path 87 is reflected by mirror 63 along optical path 64 through lens 65 and through mirror 55 and to amplifier 58 along optical path 56.

The portion of the pump energy 49 which is converted by oscillator 45 to the first Stokes wavelength passes through reflector 48′ shown by arrow 50 through quarter wave plate 88 where the polarization is changed to be normal to the page shown by solid circle 89. The radiant energy at the first Stokes wavelength is reflected by mirror 52' along optical path 53 through lens 54 whereupon it is reflected by mirror 55 along optical path 56 into amplifier 58. The path length of the rejected pump energy from oscillator 45 is extended relative to the path length of the first Stokes wavelength from oscillator 45 to provide a predetermined time delay to the rejected pump energy prior to entering amplifier 58. Arrows 90 through 94 minus the distance shown by arrow 95 represents the additional path length that the rejected pump energy 82 travels with respect to the output of oscillator 45 shown by arrow 50.

Figure 5:
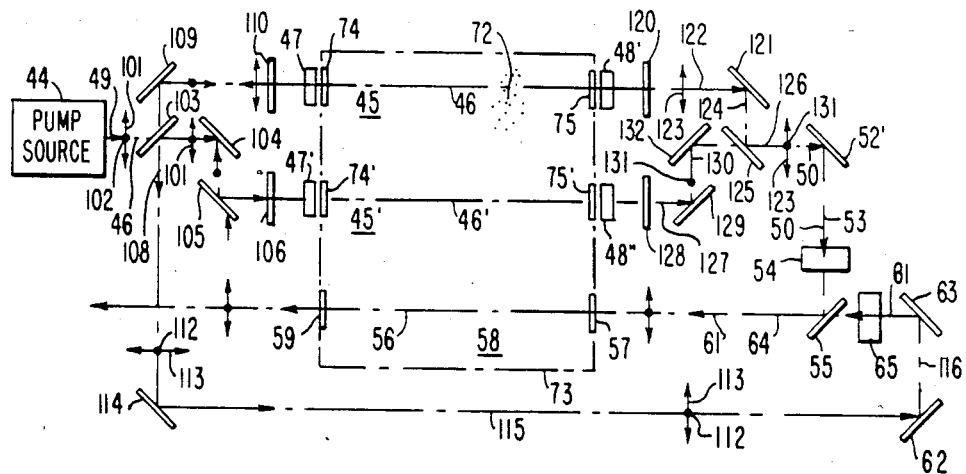
FIG. 5 is a schematic view of an alternate embodiment of FIG. 3.

FIG. 5 is a schematic view of an alternate embodiment of FIG. 3. In FIG. 5, like references are used for functions corresponding to the apparatus of FIG. 3. Pump source 44 provides radiant energy at a first wavelength along optical path 46. Radiant energy 49 may have two polarization components shown by arrow 101 and solid circle 102. Component 101 of radiant energy 49 passes through polarizer 103 and is reflected by mirrors 104 and 105 through quarter wave plate 106 into oscillator 45'. Reflector 48" reflects pump energy making a first pass through oscillator 45' back through oscillator 45' along optical path 46' through quarter wave plate 106 where it is reflected by mirrors 105 and 104 and polarizer 103 unto optical path 108.

Component 102 of radiant energy 49 is reflected by polarizer 103 and by mirror 109 along optical path 46 through quarter wave plate 110 into oscillator 45. Reflector 48' reflects the portion of pump energy not absorbed by oscillator 45 back through oscillator 45 through quarter wave plate 110 along optical path 46 where it is reflected by mirror 109 onto optical path 108 where it passes through polarizer 103. Optical path 108 has both components of the rejected pump energy shown by solid circle 112 and arrow 113.

Mirror 114 reflects rejected pump energy along optical path 115 where it is reflected by mirror 62 on the optical path 116. The rejected pump energy traveling along optical path 116 is reflected by mirror 63 through lens 65 and through mirror 55 along optical path 64 into amplifier 58 along optical path 56 which is colinear with optical path 64. Amplifier 58 functions to convert the rejected pump energy at a first wavelength to the first Stokes wavelength.

In oscillator 45, the portion of the pump energy converted to the first Stokes wavelength exits oscillator 45 through partially transmissive reflector 48' through quarter wave plate 120 towards mirror 121. The radiant energy output of oscillator 45 at the first Stokes wavelength is represented by arrow 122 having a polarization after passing through quarter wave plate 120 shown by arrow 123. The radiant energy 122 is reflected by mirror 121 along optical path 124 where it is reflected by polarization 125 along optical path 126.

The output 127 at the first Stokes wavelength of oscillator 45' passes through quarter wave plate 128 along optical path 46'. It is reflected by mirror 129 along optical path 130. The radiant energy along optical path 130 is reflected by mirror 131 along optical path 126 through polarizer 125. The output of oscillators 45 and 45' at the first Stokes wavelength is combined by polarizer 125 having both polarization components 123 and 131 to provide radiant energy output at the first stokes wavelength shown by arrow 50.

Radiant energy 50 is reflected by mirror 52' along optical path 53 through lens 54 to mirror 55 which reflects radiant energy shown by arrow 50 along optical path 64 into amplifier 58 along optical path 56. Radiant energy 50 passes through amplifier 58. The pump energy at the first wavelength is converted to the first Stokes wavelength by amplifier 58 by means of stimulated Raman scattering.

As can be seen in FIGS. 4 and 5, a Raman active gas 72 is contained in a housing 73 which is common to both the oscillator 45 or oscillators 45 and 45' and amplifier 58. By this means the size and weight is reduced and the conversion efficiency of the pump energy to the first Stokes wavelength is close to the 100% quantum efficiency limit. As can be seen in FIG. 5, the path length of the rejected pump energy is adjusted in length to provide an appropriate time delay of the rejected pump energy from double pass oscillators 45 and 45' before being injected into amplifier 58.

FIG. 6 is a graph showing typical energy conversion efficiency versus cell length. In FIG. 6, the ordinant represents energy conversion efficiency in percent and the abscissa represents cell length in centimeters. The cell length is the longitudinal length of the optical path through the Raman active gas in the oscillator in one pass between its reflectors or in the amplifier. In FIG. 6, the Raman active gas was deuterated methane $CD_4$ at a pressure of 1000 psi. The pump wavelength was 1064 nanometers. In FIG. 6, curve 140 shows the energy conversion efficiency for a given cell length for a double pass pump Raman oscillator and amplifier the embodiment corresponding to FIG. 4 or 5. Reference line 141 represents 100% quantum efficiency limit where one photon of pump energy is converted to one photon at the first Stokes wavelength by means of stimulated Raman scattering. Since the first Stokes wavelength is longer than the wavelength of the pump energy, a photon to photon conversion results in a predetermined energy loss which is in the form of heat in the form of molecular vibration or rotation.

Curve 142 represents the energy conversion efficiency as a function of cell length for a single pump pass Raman oscillator and amplifier as shown in FIG. 3. Curve 142 shows that the cell length must be longer to get optimal energy conversion efficiency.

Curve 143 shows the energy conversion efficiency as a function of cell length for a double pass pump Raman oscillator such as shown in FIGS. 1 and 2. Curve 144 shows the energy conversion efficiency as a function of cell length for a single pass pump Raman oscillator. As can be seen in FIG. 6, curves 143 and 144 have a peak energy conversion efficiency which is 55% or less. Curves 140 and 142 have a peak conversion efficiency of about 78%.

The invention describes apparatus to convert radiant energy of a first wavelength to a radiant energy of a second wavelength with high conversion efficiency by coupling either a single pass pump or double pass pump oscillator in series with a Raman amplifier wherein the rejected pump beam is delayed in time and passed through the Raman amplifier along with the output of the Raman oscillator to provide optimum conversion efficiency of the pump energy. The Raman oscillator and Raman amplifier utilize a Raman active gas such as deuterated methane $CD_4$ which is contained in a common pressure vessel having windows to provide separate optical paths for the Raman oscillator and amplifier.

The invention also describes a double pass pump Raman oscillator with an external optical system to recover any unused pump energy rejected from the oscillator and is comprised of a double pass Raman oscillator, a polarizer and a quarter waveplate when the pump source provides linearly polarized radiation. When the pump source provides unpolarized radiation, a polarizer provides a means of separating out two orthogonal polarized components and for directing the components along two optical paths through separate quarter waveplates and into separate double pass pump Raman oscillators. A mirror may be provided to reflect one component of the pump radiation from the polarizer into a double pass pump Raman oscillator. The two double pass pump Raman oscillators may have a common Raman active gas media.

I claim:

1. Apparatus to convert first radiant energy of a first wavelength to second radiant energy of a second wavelength with high conversion efficiency comprising:
   a Raman oscillator adapted for receiving a beam of said first radiant energy;
   said Raman oscillator operated below a predetermined intensity of said first radiant energy to limit unwanted Stokes and Anti-Stokes orders to provide an output of second radiant energy and of unconverted first radiant energy;
   a single pass Raman amplifier having an input and output;
   first means for coupling said second radiant energy from the output of said Raman oscillator to the input of said Raman amplifier;
   second means for delaying said unconverted first radiant energy and for coupling said unconverted first radiant energy to the input of said Raman amplifier to provide an output substantially of second radiant energy;
   said Raman oscillator and said single pass Raman amplifier including Raman active gas contained in a common pressure vessel having windows to provide separate optical paths for said Raman oscillator and said Raman amplifier.

2. The apparatus of claim 1 wherein said Raman active gas is methane having at least one hydrogen atom replaced with deuterium.

3. The apparatus of claim 1 wherein said Raman active gas is selected from the group consisting of $CD_4$, $CH_3D$, $CH_2D_2$ and $CHD_3$ and mixtures thereof.

* * * * *